United States Patent [19]

Beecken

[11] 4,172,944
[45] Oct. 30, 1979

[54] WATER INSOLUBLE STYRYL DYESTUFFS HAVING HETERO-ARYL METHYLENE SUBSTITUENT

[75] Inventor: Hermann Beecken, Leverkusen, Fed. Rep. of Germany

[73] Assignee: Bayer Aktiengesellschaft, Leverkusen, Fed. Rep. of Germany

[21] Appl. No.: 730,300

[22] Filed: Oct. 7, 1976

Related U.S. Application Data

[62] Division of Ser. No. 616,262, Sep. 24, 1975, Pat. No. 4,016,191.

[30] Foreign Application Priority Data

Sep. 24, 1975 [DE] Fed. Rep. of Germany ....... 2445583

[51] Int. Cl.² .......................................... C07D 215/48
[52] U.S. Cl. .................................:............ 546/165
[58] Field of Search .................. 260/283 CN, 239 BB, 260/526.11 R, 283 CM; 544/105; 546/165

[56] References Cited

U.S. PATENT DOCUMENTS

| | | | |
|---|---|---|---|
| 3,379,779 | 4/1968 | Strobel et al. | 260/283 CN |
| 3,398,152 | 8/1968 | Wallace et al. | 260/283 CN |
| 3,629,274 | 12/1971 | Oliver | 260/283 CN |

*Primary Examiner*—Donald G. Daus
*Assistant Examiner*—D. B. Springer
*Attorney, Agent, or Firm*—Sprung, Felfe, Horn, Lynch & Kramer

[57] ABSTRACT

The invention relates to water-insoluble styryl dyestuffs of the formula

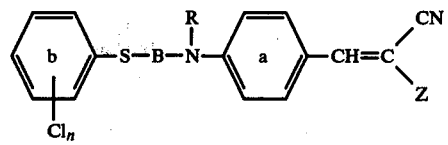

wherein B is a bridge member, R is hydrogen, alkyl, aryl or the remaining members of a partially saturated ring fused to the ring "a", Z is preferably CN and n denotes the numbers 3 to 5.

The dyestuffs are outstandingly suitable for the dyeing of hydrophobic fibre materials in yellow shades. The dyeings are distinguished by excellent fastness to light.

4 Claims, No Drawings

WATER INSOLUBLE STYRYL DYESTUFFS HAVING HETERO-ARYL METHYLENE SUBSTITUENT

This is a division of application, Ser. No. 616,262, filed Sept. 24, 1975 now U.S. Pat. No. 4,016,191, issued Apr. 5, 1977.

The present invention relates to dyestuffs which are practically insoluble in water, of the formula

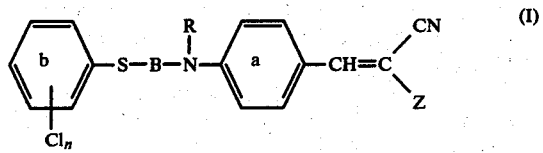

wherein
B represents a bridge member,
R represents hydrogen, alkyl, aryl or the remaining members of a partially saturated 5-membered or 6-membered ring fused to the ring "a",
Z represents the groupings CN, $SO_2Y$, COY, $CO_2Y$ or $CONW_1W_2$,
wherein
Y denotes alkyl, cycloalkyl, aralkyl or aryl and
$W_1$ and $W_2$ conjointly with the N atom can form the remaining members of a 5-membered to 7-membered saturated heterocyclic ring, and
n denotes the numbers 3 to 5
and wherein
the alkyl, cycloalkyl, aralkyl and aryl radicals mentioned, and the rings "a" and "b" can contain further non-ionic substituents and in addition the rings "a" and "b" can contain further fused-on rings,
as well as to their manufacture and use for dyeing and printing synthetic fibre materials and for bulk dyeing of thermoplastics.

Suitable "non-ionic substituents" are groups which are customary in styryl dyestuff chemistry and do not confer solubility in water in the neutral to acid range, or groups such as are mentioned below in connection with the preferred dyestuffs.

Suitable "bridge members" in the sense of the invention are non-chromophoric members, preferably $C_2$- to $C_5$-alkylene chains which are optionally interrupted by an oxygen atom or sulphur atom and which can also be branched and/or be substituted by a $C_1$- to $C_4$-alkoxy or -alkenyloxy group or a benzyloxy or phenoxy group.

Suitable alkyl radicals are those with 1 to 4 C atoms, which can be substituted by halogen, CN, COOH or $C_1$- to $C_4$-alkoxy. Methyl and ethyl are very particularly preferred.

Suitable aryl radicals are phenyl and naphthyl radicals which can be substituted, preferably monosubstituted to trisubstituted, by halogen, $C_1$ to $C_4$-alkyl, $C_1$ to $C_4$-alkoxy, $C_1$ to $C_4$-alkylmercapto, benzyl, cyclopentyl or cyclohexyl. Optionally substituted phenyl radicals are particularly preferred.

The cycloalkyl radicals mentioned are above all cyclopentyl and cyclohexyl radicals which can in turn be monosubstituted, disubstituted or trisubstituted by chlorine, methyl and others.

Suitable aralkyl radicals are, above all, benzyl, phenethyl and phenylpropyl.

Suitable heterocyclic rings which $W_1$ and $W_2$ can form are piperidine, pyrrolidine, N-methyl-piperazine, morpholine or thiomorpholine.

Preferably, $W_1$ and $W_2$ do not simultaneously represent aryl and/or cycloalkyl.

Particularly suitable substituents in the ring "a" are halogen, $C_1$- to $C_3$-alkyl, $C_1$ to $C_3$-alkoxy, $C_2$ to $C_5$-alkanoyloxy, $C_2$- to $C_5$-alkanoylamino, benzoyloxy, benzoylamino or phenoxy. Preferably, 1 to 3 of these substituents are present. Preferentially suitable substituents in the ring "b" are $C_1$ to $C_4$-alkyl, $C_1$-$C_4$-alkoxy, CN or COOH.

In the preceding text "halogen" is to be understood as fluorine and, preferably, chlorine or bromine.

A group of preferred dyestuffs according to the invention corresponds to the formula

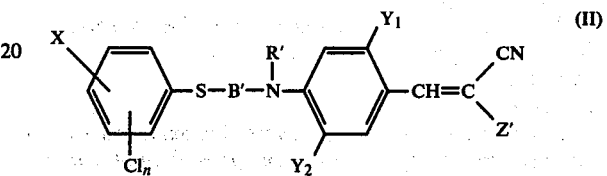

wherein
X represents $C_1$- to $C_4$-alkyl, $C_1$- to $C_4$-alkoxy, CN or hydrogen,
n represents 4–5,
B' represents $—C_2H_4—$, $—C_3H_6—$, $—C_4H_8—$, $—CH(CH_3)CH_2—$, $—CH(C_6H_5)CH_2—$, $—CH(CH_2OCH_3)CH_2—$, $—CH(CH_2OC_2H_5)CH_2—$, $—CH(CH_2OCH_2CH=CH_2)CH_2—$, $—CH(CH_2OC_6H_5)CH_2—$ or $—CH(CH_2OCH_2C_6H_5)CH_2—$,
R' represents $CH_3$, $C_2H_5$, $C_3H_7$, $CH_2C_6H_5$, $C_2H_4OCH_3$, $C_2H_4OC_2H_5$, $C_2H_4CN$, $C_2H_4C_6H_5$, $CH_2CH(C_6H_5)CH_3$ or $(CH_2)_3C_6H_5$,
$Y_1$ represents hydrogen, $C_1$- to $C_4$-alkyl, $C_1$- to $C_4$-alkoxy, $CF_3$, $C_2$- to $C_4$-alkanoylamino, phenoxy, F, Cl or Br,
$Y_2$ represents hydrogen, $C_1$- to $C_4$-alkyl, $C_1$- to $C_4$-alkoxy, chlorine or bromine and
Z' represents CN or COOQ',
wherein
Q' denotes $C_1$- to $C_4$-alkyl, phenyl-$C_1$- to -$C_3$-alkyl or cyclohexyl.

A further group of preferred dyestuffs in the sense of the invention are those of the formula II wherein R' and $Y_2$ conjointly form the missing members of the partially substituted, optionally methyl-, ethyl- or chlorine-substituted, heterocyclic structure of an indoline, 1,2,3,4-tetrahydroquinoline, 2,3-dihydrobenzoxazine-(1,4) or 2,3,4,5-tetrahydrobenzazepine ring system.

Particularly preferred dyestuffs according to the invention are those of the formula

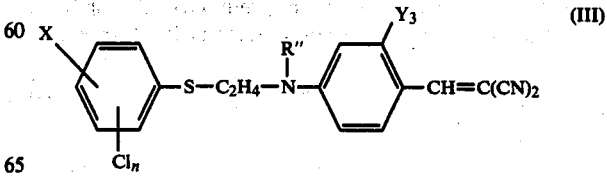

wherein
X and n have the abovementioned meanings and

R" denotes a methyl, ethyl, propyl, benzyl, phenethyl or phenpropyl group and

Y³ denotes hydrogen or a methyl group.

Particularly valuable dyestuffs, within the scope of the invention, have the formula

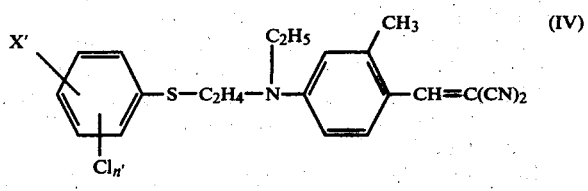

wherein

X' represents hydrogen, methyl, ethyl or a cyano group and n' represents 4 or 5.

Most valuable dyestuffs are those of the abovementioned formulae
wherein
n and n'=5.

The new dyestuffs are prepared in a manner which is in itself known, by reacting aldehydes of the formula

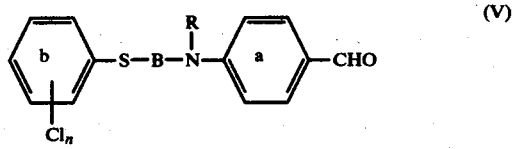

or their functional derivatives, for example those of the formula

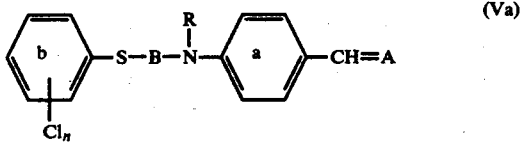

wherein n, B, R, a and b have the meanings indicated under formula I and

A represents =N—R¹ (aldimines) or

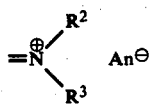

(imonium salts)
wherein

R¹ preferably denotes a phenyl, sulphophenyl or carboxyphenyl radical,

R² and R³ represent $C_1$- to $C_4$-alkyl and

R³ also represents phenyl and

An⊖ represents an acid anion, preferably Cl⁻ or Br⁻, with methylene-active compounds of the formula

wherein

Z can have the meanings indicated under formula I.

The reactions are carried out at temperatures between 20° and 160° C., preferably in the temperature range of 50°–120° C., in the melt or, in most cases, in a solvent which is inert under the reaction conditions. Examples of suitable solvents which may be mentioned are lower aliphatic alcohols with 1 to 4 carbon atoms, especially methanol, ethanol, the propanols and butanols, and also benzene, toluene, xylene, chlorobenzene, dichlorobenzenes, chloroform, dimethylformamide, dimethylsulphoxide and acetonitrile. To accelerate the reaction, the basic catalysts customary for the Knoevenagel reaction can be added, such as, for example, ammonia, diethylamine, triethylamine, piperidine, morpholine, N-ethylpiperidine, N-methylmorpholine, basic ion exchange resins, alkali metal hydroxides, alkali metal alcoholates, alkali metal carbonates, alkali metal acetates, and acetates of ammonia and of organic bases, such as, for example, ammonium acetate or piperidine acetate. However, the reaction can also be carried out readily in the presence of acetic acid and even in glacial acetic acid as the solvent.

It is also possible, with advantage, to dispense with the customary isolation of the aldehydes V, which in most cases entails considerable losses, and to use these aldehydes directly, after decomposition of exces of Vilsmeier reagent by means of lower aliphatic alcohols and adjusting the pH value to about 6.5–8.5, for condensation with the methylene-active components VI. For this purpose, the presence of an emulsifying additive, for example of oxethylation products of higher alcohols or substituted phenols, can be useful, particularly if aqueous alkali or aqueous ammonia are used to adjust the pH.

Examples of suitable methylene-active compounds VI are malonic acid dinitrile, cyanoacetic acid methyl ester, cyanoacetic acid ethyl ester, cyanoacetic acid propyl ester, cyanoacetic acid butyl ester, cyanoacetic acid cyclohexyl ester, cyanoacetic acid γ-methoxypropyl ester, cyanoacetic acid cyanoethyl ester, cyanoacetic acid β-chloroethyl ester, cyanoacetic acid β-acetoxyethyl ester, cyanoacetic acid benzyl ester, cyanoacetic acid 4-chlorobenzyl ester, cyanoacetic acid 3,4-dichlorobenzyl ester, cyanoacetic acid 2,4,6-trichlorobenzyl ester, cyanoacetic acid β-phenoxyethyl ester, cyanoacetic acid β-(4-chlorophenoxy)-ethyl ester, cyanoacetic acid β-(4-methylphenoxy)-ethyl ester, cyanoacetic acid β-(4-tert.-butylphenoxy)-ethyl ester, cyanoacetic acid β-(4-cyclohexylphenoxy)-ethyl ester, cyanoacetic acid γ-phenoxypropyl ester, cyanoacetic acid β-phenylethyl ester, cyanoacetic acid γ-phenylpropyl ester, cyanoacetic acid γ-phenylallyl ester, cyanoacetic acid α-naphthylmethyl ester, cyanoacetamide, cyanoacetic acid N-methylamide, cyanoacetic acid N,N-dimethylamide, cyanoacetic acid α-cyanoethylamide, cyanoacetic acid N-n-butylamide, cyanoacetic acid cyclohexylamide, cyanoacetic acid diethylamide, cyanoacetic acid pyrrolidide, cyanoacetic acid piperidide, cyanoacetic acid anilide, cyanoacetic acid 3-chloroanilide, cyanoacetic acid 2-ethoxyanilide, cyanoacetic acid 4-t-butylanilide, cyanoacetic acid 4-cyclohexylanilide, cyanoacetic acid α-naphthylamide, methylsulphonylacetonitrile, n-butylsulphonylacetonitrile, phenylsulphonylacetonitrile and 4-t-butylphenylsulphonylacetonitrile.

To prepare suitable aldehydes V or their functional derivatives V a it is possible to use aromatic bases of the formula

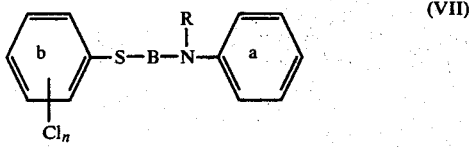

(VII)

wherein
n, B, R, a and b have the meanings indicated for formula I.

These bases are reacted, in a manner which is in itself known, with so-called Vilsmeier reagents, that is to say mixtures of N-formyl compounds

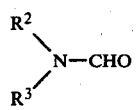

and inorganic acid halides, preferably phosphorus oxychloride, thionyl chloride or phosgene, or are formylated by the method of Duff (Journal of the Chemical Society [London] 1952, pages 1,159–1,164), advantageously in accordance with the variant of German Patent Specification No. 1,206,879, Suitable aldimines V a are obtained, for example, in accordance with the instructions in U.S. Pat. No. 2,583,551 (Example 17).

Suitable methods for the preparation of the bases VII are those known from the literature for the preparation of N-alkoxyalkyl-anilines and N-aryloxyalkyl-anilines, above all the reaction of N-halogenoalkyl-anilines, N-halogenoalkylindolines, N-halogenoalkyl-tetrahydroquinolines and the like with thiophenolates VIII

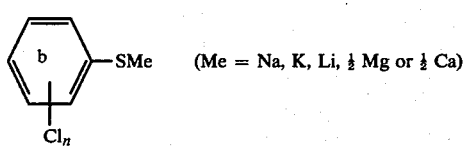   (Me = Na, K, Li, ½ Mg or ½ Ca)

in the melt, or in solvents which are inert under the reaction conditions (aliphatic $C_1$- to $C_5$-alcohols, benzene, toluene, chlorobenzene, ethylene glycol monoethyl ether or ethylene glycol monomethyl ether, dimethylformamide, N-methylpyrrolidone and others) at temperatures of up to about 140° C., preferably at 50°–100° C.

The preparation of suitable aldehydes V can also be carried out in another sequence, by reacting the thiophenolates with already formylated halogenoalkyl-anilines, according to

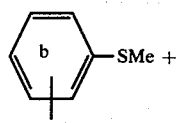

(VIII)

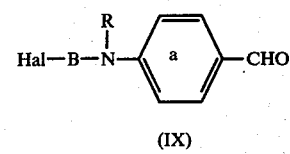

(IX)

$$\xrightarrow{- \text{MeHal}} V$$

wherein
Hal denotes bromine or preferably chlorine.
This reaction is also in itself known (compare Example 1 of U.S. Pat. No. 3,635,957).

In the thiophenolates VIII, Me represents 1 equivalent of an alkali metal ion, alkaline earth metal ion or heavy metal ion. Examples which may be mentioned are the ions of lithium, sodium, potassium, magnesium, calcium, lead, copper or silver, preferably those of sodium and potassium. The thiophenolates can be employed as such, but are suitably produced in the reaction medium itself, if appropriate in the presence of the halogenoalkyl compounds, from the corresponding thiophenols, by adding at least one equivalent of a metal compound. Examples of suitable compounds for this purpose are the oxides, hydroxides, bicarbonates, carbonates, acetates and the like. The use of equivalent amounts of organic bases, such as, for example, triethylamine, tripropylamine, tri-(hydroxypropyl)-amine, tributylamine, N-methylpiperidine, N-ethylpiperidine, N-methylmorpholine, dimethylaniline or pyridine, in order to bind the hydrogen halide, is also possible. The reactions are carried out in the melt or in organic solvents which are inert under the reaction conditions. They take place slowly even at room temperature but are suitably carried out at elevated temperatures, preferably in the range of 50°–150° C.

Example of suitable solvents are lower alcohols, such as methanol, ethanol, propanols, butanols, or amyl alcohols, and also toluene, xylene, dimethylformamide and N-methylpyrrolidone.

A further method of preparation of the bases VII is to react halogenoalkyl-thioethers X with secondary bases XI in a manner which is in itself known, in accordance with the following equation:

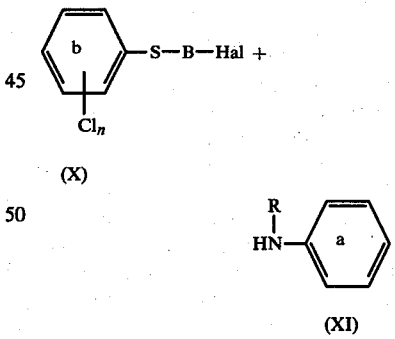

$$\xrightarrow{- \text{H Hal}} \text{VII}$$

wherein
X, n, B, Hal, R and a have the meanings indicated in the preceding text.

The reaction takes place in solvents which are inert under the reaction conditions, for example in toluene, xylene, chlorobenzene or dichlorobenzene or in higher alcohols, such as butyl alcohols and amyl alcohols, in the presence of customary hydrogen halide acceptors, such as alkali metal oxides, hydroxides or carbonates or alkaline earth metal oxides, hydroxides or carbonates, or organic bases, such as tributylamine or dimethylaniline, at temperatures of about 80°–200° C., preferably at 120°–160° C. A particularly advantageous embodiment of the reaction utilises the secondary base XI simultaneously as a hydrogen halide acceptor and solvent by using it in at least twice the equivalent amount and within the temperature range indicated above.

To facilitate the reactions of X with XI, catalytic amounts of iodides, for example sodium iodide, potassium iodide or copper iodide, can be added (compare German Auslegeschrift (German Printed Application) No. 2,010,491, Example 2).

The N-halogenoalkylanilines or halogenoalkylthioethers X which can alternatively be used for the preparation of the N-arylmercaptoalkyl bases VII are most simply accessible respectively from the corresponding secondary aniline bases XI and the thiophenols VIII (Me=H) by converting these into the hydroxyalkyl compounds by oxalkylation, for example by means of ethylene carbonate, ethylene oxide, propylene oxide, methyl glycidyl ether, ethyl glycidyl ether, allyl glycidyl ether, phenyl glycidyl ether or benzyl glycidyl ether or styrene oxide or by reaction with halogenoalkanols, for example β-halogenoethanols, halogenopropanols or halogenobutanols, and obtaining the halogenoalkyl compounds therefrom by the action of acid halides, such as phosphorus oxychloride, phosphorus tribromide or thionyl chloride.

One-stage processes for arriving at the halogenoalkyl compounds mentioned are also known and entail carrying out a one-sided reaction of the secondary bases XI or the thiophenols with dihalogenoalkanes or dihalogenoalkenes, for example 1,2-dibromoethane, 1,2-dichloroethane, 1,3-dichloropropane, 1,3-chlorobromopropane, 1,4-dibromobutane, 1,4-dibromobut-2-ene or 1,2-dibromopropane, in the presence of a hydrogen halide acceptor.

Suitable thiophenols VIII (Me=H) which can be used for the preparation of the bases VII are, for example, 2,4,6-trichlorothiophenol, 2,4,5-trichlorothiophenol, 2,3,4-tri-chlorothiophenol, 2,3,5,6-tetrachlorothiophenol, 2,3,4,6-tetrachlorothiophenol, 2,3,5,6-tetrachloro-4-cyano-thiophenol, methyltetrachlorothiophenols, ethyltetrachlorothiophenols and pentachlorothiophenol.

Suitable secondary bases XI for the preparation of the bases VII are, for example, N-methyl-aniline, N-methyl-m-toluidine, N-methyl-m-chloroaniline, N-methyl-m-anisidine, N-ethyl-2,5-dimethoxy-aniline, N-methyl-m-phenetidine, N-methyl-2,5-diethoxy-aniline, N-ethyl-aniline, N-propyl-aniline, N-n-butyl-aniline, N-benzyl-aniline, N-phenethylaniline, N-β-phenylpropyl-aniline, N-γ-phenylpropyl-aniline, N-ethyl-m-toluidine, N-propyl-m-toluidine, N-n-butyl-m-toluidine, N-benzyl-m-toluidine, N-α-phenylethyl-m-toluidine, N-β-phenylethyl-m-toluidine, N-β-phenylpropyl-m-toluidine, N-γ-phenylpropyl-m-toluidine, N-cyanoethyl-aniline, N-methoxyethyl-m-toluidine, N-ethyl-m-phenoxy-aniline, N-ethyl-m-anisidine, N-ethyl-m-phenetidine, N-ethyl-m-chloroaniline, N-ethyl-o-toluidine, N-ethyl-3-bromoaniline, N-methyl-2-ethylaniline, N-methyl-2-isopropylaniline, N-methyl-2,5-dimethylaniline, N-methyl-2-methoxy-5-methylaniline, N-butyl-3-chloroaniline, N-cyclohexylaniline, N-cyclopentyl-m-toluidine, N-methyl-2,5-dichloroaniline, N-methyl-3-propionylamino-aniline, N-benzyl-m-anisidine, N-propyl-3-trifluoromethyl-aniline, N-ethyl-3-acetamino-aniline, N-cyanoethyl-m-toluidine, 2-methyl-, 2-ethyl-, 2-methyl-6-chloro-, 2,5-dimethyl-, 2,3,3-trimethyl-, 2,3,3,6-tetramethyl-2,3,3-trimethyl-6-chloro-, 2,3,3-trimethyl-6-methoxy- and 2,3,3,7-tetramethyl-2,3-dihydroindole, 2-methyl-, 2,7-dimethyl-, 2,2,4-trimethyl-, 2-methyl-7-methoxy-, 2-methyl-7-chloro-, 2-methyl-7-bromo-, 2-methyl-7-acetamino-, 2-methyl-7-phenyl-, 2,2,4-trimethyl-7-methoxy-, 2,2,4-trimethyl-7-bromo-, 2,2,4-trimethyl-7-chloro-, 2,2,4-trimethyl-7-trifluoromethyl-, 2-ethyl-7-methyl-, 2-n-butyl-7-methyl- and 2-i-propyl-7-methyl-1,2,3,4-tetrahydroquinoline, 3,6-dimethyl-, 2,3-dimethyl-, 2,3,6-trimethyl-, 2,2,3-trimethyl-, 2,2,3,6-tetramethyl-, 2,2,3-trimethyl-6-methoxy-, 2,2,3-trimethyl-6-chloro-, 2,2,3-trimethyl-6-acetamino- and 3-ethyl-6-methyl-2,3-dihydrobenzoxazine-(1,4) and 3,3-tetramethylene-2-methyl-, 3,3-pentamethylene-2-methyl-, 3,3-tetramethylene-2,6-dimethyl-, 3,3-pentamethylene-2,6-dimethyl-, 2,3-trimethylene-6-methyl-, 2,3-tetramethylene and 2,3-tetramethylene-6-methyl-2,3-dihydroindole.

If the N-hydroxyalkyl derivatives of the abovementioned secondary bases XI are reacted by the Vilsmeier reaction, for example with dimethylformamide and phosphorus oxychloride, the corresponding N-chloroalkyl-aldehydes IX are obtained therefrom in a known manner; these serve for the preparation of the aldehydes V, as explained above.

From the large number of the aldehydes IX which can be prepared and are suitable for reaction with thiophenols VIII, some may be mentioned by way of examples: N-β-chloroethyl-N-methyl-4-aminobenzaldehyde, N-β-chloroethyl-N-ethyl-4-aminobenzaldehyde, N-β-chloropropyl-N-ethyl-4-aminobenzaldehyde, N-γ-chloropropyl-N-ethyl-4-aminobenzaldehyde, N-β-chloro-β-phenylethyl-N-methyl-m-toluidin-4-aldehyde, N-β-chloroethyl-N-benzyl-m-toluidin-4-aldehyde, N-β-chloroethyl-N-γ-phenylpropyl-m-toluidin-4-aldehyde, N-β-chloro-γ-phenoxypropyl-N-ethyl-m-toluidin-4-aldehyde, N-β-chloroethyl-N-β-phenylpropyl-2-chloro-4-aminobenzaldehyde, N-β-chloroethyl-N-methyl-2,5-dimethoxy-4-aminobenzaldehyde, N-β-bromobutyl-N-methyl-4-aminobenzaldehyde, N-β-chloroethyl-6-formyl-2-methyl-, N-β-chloroethyl-6-formyl-2,7-dimethyl-, N-β-chloroethyl-6-formyl-2,2,4-trimethyl-, N-β-chloroethyl-6-formyl-2-methyl-7-methoxy-, N-β-chloroethyl-6-formyl-2,2,4-trimethyl-7-chloro-, N-β-chloroethyl-6-formyl-2,2,4,7-tetramethyl-, N-β-chloropropyl-6-formyl-2,2,4,7-tetramethyl-, N-γ-chloropropyl-2,2,4-trimethyl-, N-β-chloroethyl-6-formyl-2-ethyl-7-methyl- and N-β-chloroethyl-6-formyl-2,2,4-trimethyl-7-trifluoromethyl-1,2,3,4-tetrahydroquinoline, N-β-chloroethyl-7-formyl-3,6-dimethyl-, N-β-chloroethyl-7-formyl-2,3,6-trimethyl-, N-β-chloroethyl-7-formyl-3-methyl-6-chloro-, N-γ-chloropropyl-7-formyl-2,3,6-trimethyl- and N-β-chloropropyl-7-formyl-3-ethyl-5-methoxy-2,3-dihydroxybenzoxazine-(1,4) and N-β-chlorobutyl-5-formyl-2,3,3-trimethyl-, N-γ-chloropropyl-5-formyl-2,3,3-trimethyl-, N-β-chloropropyl-5-formyl-2,3,3-trimethyl- and N-β-chloroethyl-5-formyl-2,3,3-trimethyl-2,3-dihydroindole.

Finally, the dyestuffs according to the invention can also be prepared by first condensing the N-halogenoalkylaldehydes IX with the methylene-active compounds VI to give the N-halogenoalkyl-styryl dyestuffs XII and then reacting these in a manner which is in itself known with thiophenolates VIII, in accordance with the following equation

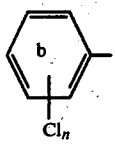

(VIII)

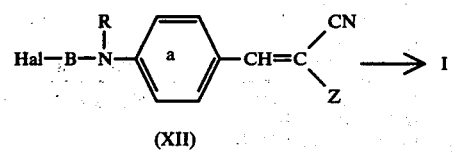

wherein
b, n, Me, Hal, B, R, a and Z have the abovementioned meanings.

The reaction conditions can be selected analogously to Example 1 of Swiss Patent Specification No. 505,876.

The dyestuffs according to the invention are outstandingly suitable for dyeing and printing hydrophobic fibre materials, especially polyesters, for example those from terephthalic acid and ethylene glycol or 1,4-bis-(hydroxymethyl)-cyclohexane, polycarbonates, for example those from α,α-dimethyl-4,4'-dihydroxy-diphenylmethane and phosgene, cellulose esters, for example cellulose triacetate, and fibres based on polyvinyl chloride.

The dyestuffs are used in accordance with the known dyeing processes, for example in the exhaustion process, as aqueous dispersions in the presence of customary dispersing agents and, if appropriate, customary swelling agents (carriers), at temperatures near 100° C., or without carriers at 120°–140° C. (HT process).

Furthermore, they are outstandingly suitable for dyeing in accordance with the known thermosol process. They do not dye, or only dye slightly, wool and cotton present in the dye bath at the same time, so that they are very suitable for use in dyeing polyester/wool and polyester/cellulose fibre mixed fabrics.

Their solubility in numerous organic solvents is excellent, and they can be used for dyeing lacquers and oils, bulk-dyeing of plastics, such as polystyrene and polyethylene, and dyeing of fibres in accordance with the customary spin-dyeing processes.

The dyestuffs according to the invention impart clear yellow colorations of very good fastness to light and good fastness to washing and sublimation to the hydrophobic materials mentioned.

They can be used for combination dyeing with blue azo and anthraquinone disperse dyestuffs and in that case given green dyeings on cellulose triacetate and on polyester, which have good fastness to light and show no "catalytic fading".

The good stability in dye baths, and stability to boiling, of the dyestuffs according to the invention, in neutral to moderately basic liquors or printing pastes (pH stability up to about pH 10) should be singled out particularly; as a result, the dyestuffs are also very suitable for one-bath dyeing (thermosol-thermofixing process) and for printing polyester/cotton mixed fabrics in combination with reactive dyestuffs which require the presence of alkali (sodium carbonate or sodium bicarbonate).

In the examples which follow, parts denote parts by weight, unless expressly stated otherwise, they bear the same relation to parts by volume (pts. by vol.) as the gram to the milliliter. The temperatures quoted are to be understood as degrees centigrade.

EXAMPLE 1

31.1 parts of pentachlorothiophenol and 19.8 parts of N-ethyl-N-β-chloro-ethyl-m-toluidine are added successively to a solution of 2.53 parts of sodium in 160 parts by volume of ethanol and the mixture is heated for 6 hours to the reflux temperature. After cooling, the product which has crystallised out is filtered off, washed with a little ethanol and then thoroughly washed with water, and dried in vacuo at 40° C. 43.2 parts of N-ethyl-N-(β-pentachlorophenylmercaptoethyl)-m-toluidine of melting point 75°–80° C. are obtained. The base is sufficiently pure for the further reaction.

For the formylation, 39.9 parts of the crude base are dissolved in 45 parts of dimethylformamide, 15.3 parts of phosphorus oxychloride are then added dropwise whilst stirring and occasionally cooling, in such a way that the temperature does not rise significantly above 60° C., and the mixture is then warmed to 60°–65° C. for 15 hours. The mixture is then allowed to cool to about 40° C. and is decomposed by dropwise addition of 70 parts by volume of methanol over the course of half an hour, whilst maintaining an internal temperature of 40°–50° C. by cooling. Thereafter, the pH value is adjusted to above 8 by adding about 30 parts by volume of concentrated aqueous ammonia or an equivalent amount of alkali metal hydroxide solution, whereupon the aldehyde separates out. It is occasionally first obtained as an oil, but crystallises throughout on further stirring. It is isolated by filtering off and washing with a little methanol and then with a copious amount of water, and is dried in vacuo. The yield is 38–40 parts of N-ethyl-N-(β-pentachlorophenylmercaptoethyl)-2-methyl-4-aminobenzaldehyde which after recrystallisation from toluene forms colourless prisms of melting point 137°–138.5° C.

35.2 parts of the aldehyde are dissolved in about 80 parts by volume of dimethylformamide by warming, 0.25 part by volume of piperidine and 5.3 parts of malodinitrile are then added and the mixture is warmed to 70° C. for 2 hours. About 400 parts by volume of methanol are then added, the mixture is stirred for some time longer at 15°–20° C. and the dyestuff which has crystallised out is filtered off. It is thoroughly washed with methanol and dried in vacuo at 100° C. 35.3 parts of dyestuff of the formula

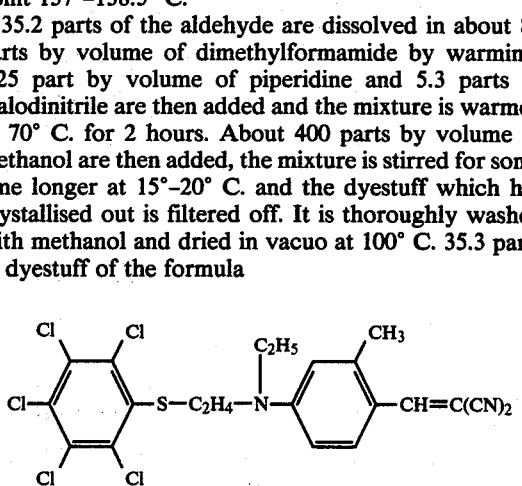

are obtained.

The dyestuff can be purified by recrystallisation from n-butanol and then melts at 155°–156° C. However, this is not necessary for its use for tinctorial applications. The dyestuff dyes polyester fibres and triacetate rayon in clear, greenish-tinged yellow shades of very good fastness to light, wet processing and sublimation and shows virtually no "catalytic fading" in green mixtures with blue azo dyestuffs and anthraquinone dyestuffs.

The aldehyde used in this example can also be obtained in accordance with the following procedure: 2.53 parts of sodium are dissolved in 160 parts by volume of ethanol, 31.1 parts of pentachlorothiophenol followed by 22.5 parts of N-ethyl-N-β-chloroethyl-2-methyl-4-aminobenzaldehyde are added and the mixture is heated to the reflux temperature for several hours, until the β-chloroethyl-aldehyde is virtually no longer detectable by chromatography. After cooling, the pentachlorophenylmercapto-aldehyde can be isolated in good yield in the abovementioned manner.

The same result is obtained if the procedure of Example 1 of German Offenlegungsschrift (German Published Specification) No. 2,301,461 is applied to pentachlorothiophenol.

If the aldehyde of the preceding example is reacted analogously with cyanoacetic acid derivatives instead of with malodinitrile, dyestuffs with comparably valuable tinctorial properties are again obtained. Some examples are summarised in the table which follows. The shades of their dyeings on polyester fibres and cellulose triacetate fibres are throughout somewhat more greenish-tinged than the colour shade of the corresponding malodinitrile dyestuff.

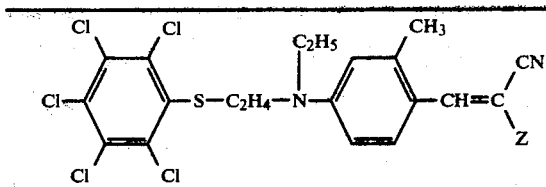

| Example No. | —Z | Colour shade on polyester fibres |
|---|---|---|
| 2 | —COOCH₃ | Strongly greenish-tinged yellow |
| 3 | —COOC₂H₅ | " |
| 4 | —COOC₂H₄OCH₃ | " |
| 5 | —COOC₃H₆OCH₃ | " |
| 6 | —COOC₂H₄OC₂H₅ | " |
| 7 | —COOC₃H₇(n) | " |
| 8 | —COOC₂H₄CN | " |
| 9 | —COOC₄H₉(n) | " |
| 10 | —COOCH₂—C₆H₅ | " |
| 11 | —COOC₂H₄—C₆H₅ | " |
| 12 | —COOC₃H₆—C₆H₅(n) | " |

The table which follows describes, in further examples, dyestuffs according to the invention which are obtained analogously to Example 1 by condensation of analogously prepared aldehydes with malodinitrile or cyanoacetic acid derivatives, and also the colour shade of the particular styryl dyestuff on polyester fibres and cellulose triacetate fibres.

| Example | Structure | Colour shade |
|---|---|---|
| 13 | Cl₅C₆—S—C₂H₄—N(C₂H₅)—C₆H₄—CH=C(CN)₂ | Greenish-tinged yellow |
| 14 | Cl₅C₆—S—C₂H₄—N(CH₃)—C₆H₄—CH=C(CN)₂ | " |
| 15 | Cl₅C₆—S—C₂H₄—N(C₂H₄CN)—C₆H₄—CH=C(CN)₂ | " |
| 16 | Cl₅C₆—S—C₂H₄—N(CH₃)—C₆H₃(CH₃)—CH=C(CN)(COOCH₃) | " |
| 17 | Cl₅C₆—S—CH(CH₃)—CH₂—N(CH₃)—C₆H₃(CH₃)—CH=C(CN)₂ | " |
| 18 | Cl₅C₆—S—CH(CH₂—OCH₃)—CH₂—N(C₂H₅)—C₆H₃(CH₃)—CH=C(CN)₂ | " |
| 19 | Cl₅C₆—S—C₂H₄—N(CH₂C₆H₅)—C₆H₃(CH₃)—CH=C(CN)₂ | " |

-continued

| Example | Structure | Colour shade |
|---|---|---|
| 20 | Cl₅C₆—S—C₂H₄—N(C₂H₅)—C₆H₃(CH₃)—CH=C(CN)₂ | " |
| 21 | Cl₅C₆—S—CH(CH₂OC₆H₅)—CH₂—N(C₂H₅)—C₆H₃(CH₃)—CH=C(CN)₂ | " |
| 22 | Cl₅C₆—S—C₂H₄—N((CH₂)₃C₆H₅)—C₆H₃(CH₃)—CH=C(CN)₂ | " |
| 23 | Cl₅C₆—S—C₂H₄—N(C₂H₅)—C₆H₃(CH₃)—CH=C(CN)₂ | " |
| 24 | Cl₅C₆—S—C₂H₄—N(C₂H₅)—C₆H₃(OCH₃)—CH=C(CN)₂ | " |
| 25 | Cl₅C₆—S—C₂H₄—N fused tetrahydroquinoline with CH₃, C(CH₃)₂, CH₃, CH=C(CN)₂ | Slightly greenish-tinged yellow |
| 26 | Cl₅C₆—S—C₂H₄—N fused ring with C(CH₃)₂, CH₂, CH—CH₃, CH₃, CH=C(CN)₂ | " |
| 27 | Cl₅C₆—S—C₂H₄—N fused oxazine ring with CH(C₂H₅)—CH₂—O, CH₃, CH=C(CN)₂ | " |

| Example | Structure | Colour shade |
|---|---|---|
| 28 | (structure) | Greenish-tinged yellow |
| 29 | (structure) | " |
| 30 | (structure) | " |
| 31 | (structure) | " |
| 32 | (structure) | " |
| 33 | (structure) | " |
| 34 | (structure) | " |

* The radical Cl₅C₆ represents a pentachlorophenyl radical

EXAMPLE 35

1 part of a dyestuff of the formula

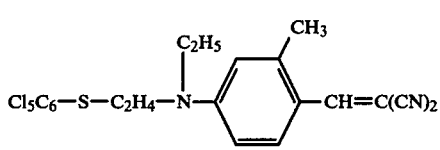

is dissolved in 25 parts of dimethylformamide, 1 part of a dispersing agent (alkylaryl polyglycol ether) is added and a fine dispersion is prepared by stirring the mixture into 4,000 parts by volume of water. In addition, 20 g of a carrier (cresontic acid ester) and 4 g of monosodium dihydrogen phosphate are added and the pH value of the dye bath is adjusted to 4.5–5 with acetic acid. 100 parts of previously cleaned polyester material (polyethylene glycol terephthalate fibres of the Dacron type, of Messrs. Dupont are introduced into the dyebath at 40°–50° C., the temperature is raised to 80°–85° C. over the course of 15–20 minutes and is kept thereat for 20 minutes, and the bath is now gradually brought to the boil. After boiling for 1–1.5 hours, the dyeing process is complete. The dyed material is rinsed once hot, and is then rinsed cold and dried. It exhibits a clear, greenish-tinged yellow coloration of very good fastness to light, washing and sublimation.

The dyestuff can also be used as a compounded paste or compounded powder by grinding it, as an aqueous paste, with dispersing agents (for example ligninsulphonates) and, if appropriate, subsequently drying it.

If the conjoint use of a swelling agent (carrier) is dispensed with, a comparable dyeing is obtained on using a liquor ratio of 1:20 and employing the known high temperature dyeing process (HT process). Here again the prepurified polyester material is introduced at 40°–50° C. into the otherwise similarly prepared dyebath, the bath temperature is raised to 125° C. for 30–40 minutes and the material is dyed for 1–1.5 hours at 125°–130° C.

EXAMPLE 36

100 parts of a fabric of cellulose triacetate rayon is dyed for 1 hour at the boil in a dyebath prepared from 1.5 parts of the dyestuff according to Example 13, 4 parts of Marseilles soap and 4,000 parts by volume of water. The resulting greenish-tinged yellow dye has very good fastness properties.

EXAMPLE 37

1,000 parts of polystyrene are mixed with 6 parts of the dyestuff according to Example 27 and the mixture is fused in the usual manner under a nitrogen atmosphere at about 200° C. The greenish-tinged yellow injection mouldings obtained from this material show good fastness of the colour.

I claim:
1. Water-insoluble styryl dyestuff of the formula

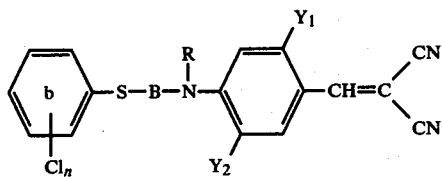

wherein
B is $C_2$–$C_5$-alkylene; $C_2$–$C_5$-alkylene interrupted by an oxygen atom or sulphur; or the foregoing substituted by $C_1$- to $C_4$-alkoxy, $C_1$–$C_4$-alkenyloxy, benzyloxy or phenoxy;
n is 3 to 5;
wherein
the ring "b" is further unsubstituted or substituted by $C_1$- to $C_4$-alkyl, $C_1$- to $C_4$-alkoxy, —CN or —COOH;
$Y_1$ is hydrogen, $C_1$- to $C_4$-alkyl, $C_1$- to $C_4$-alkoxy, $CF_3$, $C_2$- to $C_4$-alkanoylamino, phenoxy, F, Cl or Br; and
R and $Y_2$ conjointly form the missing members of an unsubstituted 1,2,3,4-tetrahydroquinoline ring or a 1,2,3,4-tetrahydroquinoline ring mono-, di- or tri-substituted with methyl or ethyl or mono-substituted with chlorine.

2. Water-insoluble styryl dyestuff of the formula

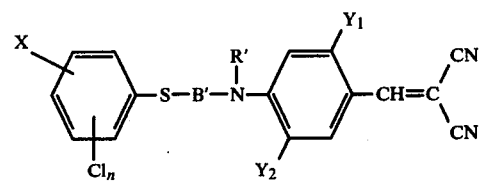

wherein
X is $C_1$- to $C_4$-alkyl, $C_1$- to $C_4$-alkoxy, CN or hydrogen;
n is 4–5;
B' is —$C_2H_4$—, —$C_3H_6$—, —$C_4H_8$—, —$CH(CH_3)CH_2$—, —$CH(C_6H_5)CH_2$—, —$CH(CH_2OCH_3)CH_2$—, —$CH(CH_2OC_2H_5)CH_2$—, —$CH(CH_2OCH_2CH=CH_2)CH_2$—, —$CH(CH_2OC_6H_5)CH_2$— or —$CH(CH_2OCH_2C_6H_5)CH_2$—;
Y is hydrogen, $C_1$- to $C_4$-alkyl, $C_1$- to $C_4$-alkoxy, $CF_3$, $C_2$- to $C_4$-alkanoylamino, phenoxy, F, Cl or Br;
R' and $Y_2$ conjointly form the missing members of an unsubstituted 1,2,3,4-tetrahydroquinoline ring or a 1,2,3,4-tetrahydroquinoline ring mono-, di- or tri-substituted with methyl or ethyl, or mono-substituted with chloro.

3. Water-insoluble styryl dyestuff of claim 2 wherein $Y_1$ is hydrogen or methyl; and
B' is ethylene.

4. Styryl dyestuff according to claim 2, of the formula

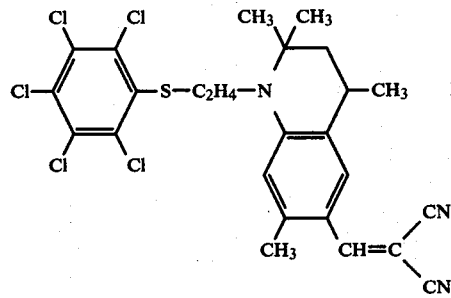

* * * * *